(12) United States Patent
Francis

(10) Patent No.: US 7,113,381 B2
(45) Date of Patent: *Sep. 26, 2006

(54) OVERCURRENT PROTECTION CIRCUIT INCLUDING AUTO-RESET BREAKER AND PTC RESISTOR

(75) Inventor: Roderick M. Francis, Clayton, NC (US)

(73) Assignee: Shallco, Inc., Smithfield, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/159,784

(22) Filed: Jun. 23, 2005

(65) Prior Publication Data

US 2005/0286195 A1 Dec. 29, 2005

Related U.S. Application Data

(63) Continuation-in-part of application No. 10/877,321, filed on Jun. 25, 2004.

(51) Int. Cl.
*H02H 5/04* (2006.01)
(52) U.S. Cl. .......................................... 361/106; 361/58
(58) Field of Classification Search ................. 361/58, 361/106
See application file for complete search history.

(56) References Cited

U.S. PATENT DOCUMENTS

| | | | |
|---|---|---|---|
| 4,422,120 A * | 12/1983 | Kobayashi et al. | ........... 361/24 |
| 4,937,696 A | 6/1990 | Yoshino et al. | |
| 5,864,458 A * | 1/1999 | Duffy et al. | ............... 361/93.9 |
| 6,278,596 B1 | 8/2001 | Simpson | |
| 6,437,544 B1 | 8/2002 | Yang | |

* cited by examiner

*Primary Examiner*—Ronald Leja
(74) *Attorney, Agent, or Firm*—Coats & Bennett, P.L.L.C.

(57) ABSTRACT

An overcurrent protection circuit for low-voltage, high-current electrical systems comprises a Positive Temperature Coefficient (PTC) resistor in series with an auto-reset thermal breaker. The breaker allows for intermittent current within an assumed product usage duty cycle, and repeatedly trips and resets on sustained high current usage or during a short-circuit fault. The PTC resistor limits current in the system to a low value when the temperature rises to the PTC resistor's trip point. The PTC resistor protects the system from thermal damage during the non-breaker-tripped portions of sustained high current use, or during continuous low-current use. The use of both the PTC resistor and auto-reset breaker provides thermal overcurrent protection while allowing for performance claims based on an assumed duty cycle of product use.

21 Claims, 12 Drawing Sheets

OVERCURRENT PROTECTION CIRCUIT INCLUDING AUTO-RESET BREAKER AND PTC RESISTOR

RELATED APPLICATIONS

This application is a Continuation in Part of U.S. patent application Ser. No. 10/877,321, filed Jun. 25, 2004.

BACKGROUND

The present invention relates generally to the field of overcurrent protection circuits and in particular to overcurrent protection circuits including an auto-reset breaker and PTC resistor(s).

Many automotive-related electrical circuits involve low voltage (e.g., 12 VDC) and relatively high currents (e.g., 10–250 A). Examples include the starter motor in automobiles and trucks, as well as aftermarket accessories for automobiles, ATVs and off-road vehicles, such as winches. Automatically resetting thermal breakers are widely used for protection in these applications. These auto-reset breakers allow for brief or intermittent high currents, but will trip, or cause an open circuit and thus prohibit current flow, under sustained high current. The breakers are thermally actuated.

A representative auto-reset thermal breaker comprises a bi-metal element and a pair of contacts. The bi-metal element changes shape when heated, breaking the contacts and opening the circuit. A snap action is accomplished by forming the bi-metal element into a shape that inverts as a reaction to reaching a design temperature. Once the circuit opens, the bi-metal element begins to cool and returns (snaps) back to the closed position, allowing current to flow. This is the auto-reset feature.

The breaker trip curve is based on a time/temperature relationship. Breakers are rated for the maximum sustained current that they will allow to flow continuously without tripping. That is, the breaker rated current is the maximum "never trip" current value. A characteristic of auto-reset thermal breakers is allowing brief or intermittent currents far in excess of their rated capacity, tripping only when the current generates sufficient heat.

Since intermittent use of aftermarket products is expected, these products are sold with performance claims that exceed actual performance available under sustained conditions. That is, the claims assume a duty-cycle for the products' use. The manufacturers use under-rated auto-reset breakers for fault protection. The breakers are sized to allow for claims of product performance and protection of the device that are only true under the assumed duty cycle. For example, the manufacturer of a bumper-mounted winch may assume a usage duty cycle of thirty seconds use during any four minute period. The manufacturer may then choose an auto-reset breaker that will not heat up sufficiently under the current load to trip within thirty seconds, although it will trip if the current load is sustained much longer than thirty seconds (e.g., the current load exceeds the rating of the breaker). The three and a half minutes of assumed non-use is sufficient time for the breaker to cool, so as to not trip during another thirty seconds of use. This duty cycle may be typical of a one using the winch to pull a truck out of the mud, and the typical user will experience the performance claimed by the manufacturer.

One using his winch all day to pull stumps from the ground, however, will exceed the designed duty cycle, and will experience repeated tripping of the breaker. During such sustained high-current use—which also occurs under a short-circuit condition—the auto-reset breaker will continue resetting, continuing to allow intermittent high currents in the system. These repeated high-current conditions could cause wiring and other system components to heat up to dangerous levels, creating a fire hazard.

Unanticipated, sustained low-current use may also create a fire hazard. For example, the starter motor in an automobile may draw up to 250 A on a cold morning; and 45–50 A during more temperate weather. This circuit may be protected by a 280 A fuse. The current draw is designed to be brief—on the order of a few seconds for a well-tuned engine. However, if some fault failed to disengage the starter motor after the engine started, it may continue to draw, e.g., 50 A, well below the current that would blow a 280 A fuse. A sustained current of 50 A may cause the wiring or components—designed only for brief currents—to heat to dangerous levels, presenting a potential fire hazard.

Protective devices other than auto-reset breakers are rarely used in aftermarket products due to adverse customer perception. For example, fuses are never used because blowing a fuse prevents use of the product until the fuse is changed, and leads to customer perception of inferior quality. Manual reset breakers are sometimes used but are considered a nuisance by customers, and are often defeated to prevent them from tripping.

Hence a need exists in the art for an overcurrent protection circuit that allows for the industry practice of duty-cycle based performance claims, and additionally provides effective protection against high-current thermal damage. In addition, a need exists for an overcurrent protection circuit that protects against both very high excess current, and unanticipated sustained low current.

SUMMARY

In one aspect, the present invention relates to an overcurrent protection circuit to limit the current in an electrical system. The overcurrent protection circuit includes a first component having conductive and nonconductive states, and assuming the nonconductive state to interrupt current flow through the circuit for a duration in response to detecting sustained current in excess of a first predetermined current value, the first component returning to the conductive state following the duration. The overcurrent protection circuit further includes a second component connected in series with the first component and operative to limit the current through the circuit to a second predetermined current value less than the first predetermined value in response to heat in excess of a predetermined thermal value.

In another aspect, the present invention relates to a method of protecting an electrical system from excessive current. Sustained current in excess of a first predetermined current value is detected. Current flow through the system is interrupted for a duration in response to detecting the excess current, and the current flow is restored following the duration. Heat in the electrical system in excess of a predetermined thermal value is detected, and the current in the system is limited to a second predetermined current value less than the first predetermined current value in response to detecting the excess heat.

In yet another aspect, the present invention relates to an overcurrent protection circuit having an input and an output. The overcurrent protection circuit includes an auto-reset breaker having a rated current connected to one of the input or the output, and one or more positive temperature coefficient (PTC) resistors connected in parallel with each other and having a trip point, connected in series with the breaker and connected to the other one of the input or the output.

In still another aspect, the present invention relates to an electrical system. The electrical system includes a power source, a load connected to the power source, and an overcurrent protection circuit connected in series between the power source and the load. The overcurrent protection circuit has an input and an output and includes an auto-reset breaker connected to one of the input or the output, and one or more positive temperature coefficient resistors connected in parallel with each other, connected in series with the breaker and connected to the other one of the input or the output In still another aspect, the present invention relates to a vehicle. The vehicle includes an electrical power source, a load connected to the power source, and an overcurrent protection circuit connected in series between the power source and the load. The overcurrent protection circuit has an input and an output and includes an auto-reset breaker connected to one of the input or the output, and one or more positive temperature coefficient resistors connected in parallel with each other, connected in series with the breaker and connected to the other one of the input or the output

DETAILED DESCRIPTION

In one or more embodiments, the present invention relates to an overcurrent protection circuit, particularly suited for low-voltage, high-current products, which fully protects the products from the adverse thermal effects of high currents while allowing present manufacturing practices and product claims. In other embodiments, the present invention relates to an overcurrent protection circuit that simultaneously protects against excessive high current and unanticipated sustained low current. However, the present invention is not limited to such applications, and may find utility in a broad range of applications. According to the present invention, both an auto-reset thermal breaker and one or more Positive Temperature Coefficient (PTC) resistors are connected in series to protect against excess temperatures resulting from current loads outside of the designed parameters.

A PTC resistor is a passive resistive device that exhibits a threshold change in resistance in response to temperature. The PTC resistor exhibits a low resistance at room temperature. The resistance of a PTC resistor increases slightly at higher temperature, up to a "trip" temperature. Once tripped, the PTC resistor exhibits a very high resistance that is substantially constant with further increases in temperature. The trip point resistance allows only enough current flow to maintain the tripped state. The PTC is self-healing; upon cooling below the trip temperature it resumes a low resistance. The PTC resistor does not depend on a time/temperature relationship, but rather trips immediately when the trip temperature is reached.

Figure 1:
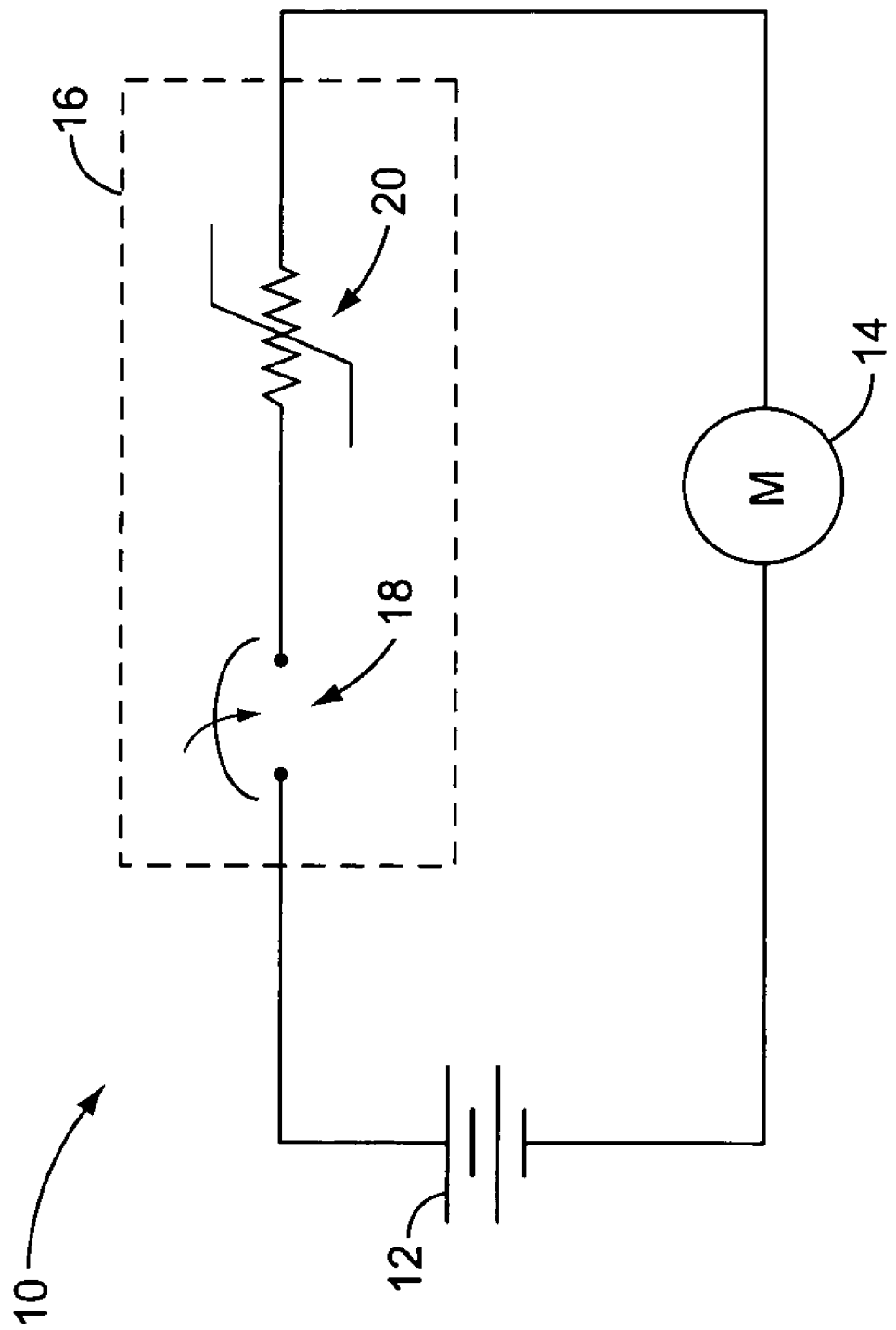
FIG. 1 is a schematic diagram of a representative electrical system including an overcurrent protection system according to one embodiment of the present invention.

FIG. 1 depicts a schematic diagram of a representative electrical system using an overcurrent protection circuit according to one embodiment of the present invention, indicated generally at 10. The system includes a power source such as a battery 12 and a load such as a motor 14 (which may, for example, comprise a winch). The overcurrent protection circuit 16 includes an auto-reset thermal breaker 18 and a PTC resistor 20, connected in series. The breaker 18 will trip on sustained high current use, but will not trip on intermittent use, such as use within the motor manufacturer's assumed duty cycle. The breaker 18 tripping is a function of the current through it in excess of its rating and the duration of that sustained excess current. Use of the product within and near its design duty cycle is not affected by the PTC resistor 20, which maintains a low resistance.

During heavy constant use or under a short-circuit fault that causes the auto-reset breaker 18 to trip and reset, the PTC resistor 20 heats up due to the intermittent but repeated high current conditions when the auto-reset breaker 18 resets and allows current flow. When the PTC resistor 20 reaches its characteristic trip temperature, it exhibits a very high resistance, limiting the current to a very low value, such as on the order of 0.5 A. The PTC resistor 20 thus protects the system from run-away thermal overload due to high current, protecting the system against fire hazard.

Figure 2:
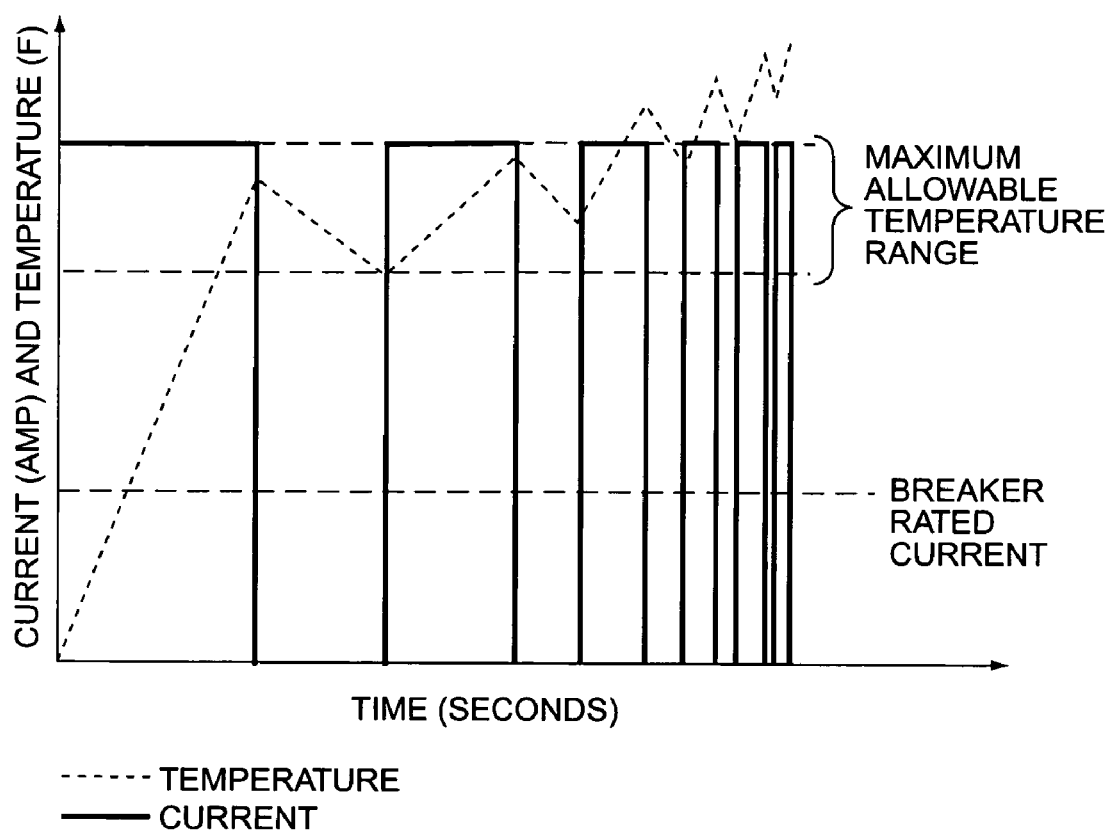
FIG. 2 is a graph depicting both current and temperature in a system with only an auto-reset breaker.

FIG. 2 depicts the thermal hazard of prior art current protection circuits comprising only an auto-reset breaker 18, when the load is run outside its assumed duty cycle (such as continuously) or during a short-circuit fault. Current is plotted in a solid line, and temperature (of wires or components in the circuit) is plotted in a dashed line on the ordinate axis. The abscissa axis represents time. Current well in excess of the rated current value of the breaker 18 flows, causing the temperature of wires and other circuit components to rise steadily. When the temperature within the auto-reset breaker 18 reaches a sufficiently high value, the breaker 18 trips, opening the circuit and dropping the current flow to zero. The breaker 18 and other circuit components begin to cool. When the breaker 18 cools sufficiently, it resets, and high current again flows in the circuit, heating circuit components as well as the breaker 18. This trip-reset cycle continues indefinitely, allowing circuit component temperatures to rise to dangerous levels.

Figure 3:
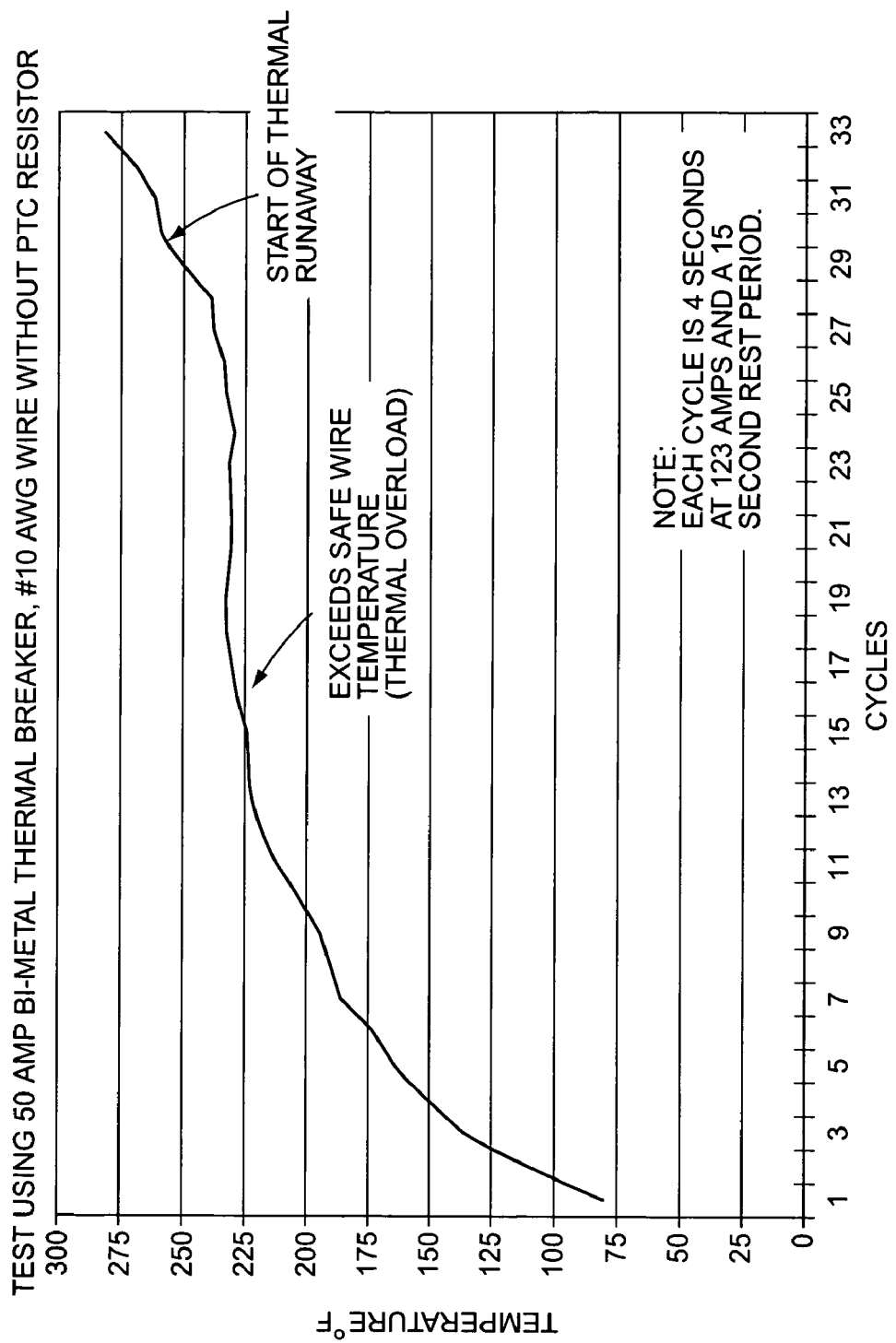
FIG. 3 is a graph of the wire temperature in an electrical system.

The auto-reset breaker 18 need not even trip and reset to generate a fire hazard. FIG. 3 depicts a graph of the temperature of a #10 AWG wire carrying 123 A in a duty cycle comprising four seconds of current flow and a fifteen second rest period, through an auto-reset breaker 18 rated at 50 A. Although the wire is carrying over twice the current for which the breaker 18 is rated, the breaker 18 never trips due to the duty cycle providing sufficient cool-off time. As shown, the wire exceeds a safe temperature, and with continued cycling of the high current, goes into thermal runaway. A similar temperature curve may result from the situation where a starter motor, protected from excess high current by a fuse, experiences sustained low currents (e.g., 45–50 A) for a duration far in excess of its designed capacity.

Figure 4:
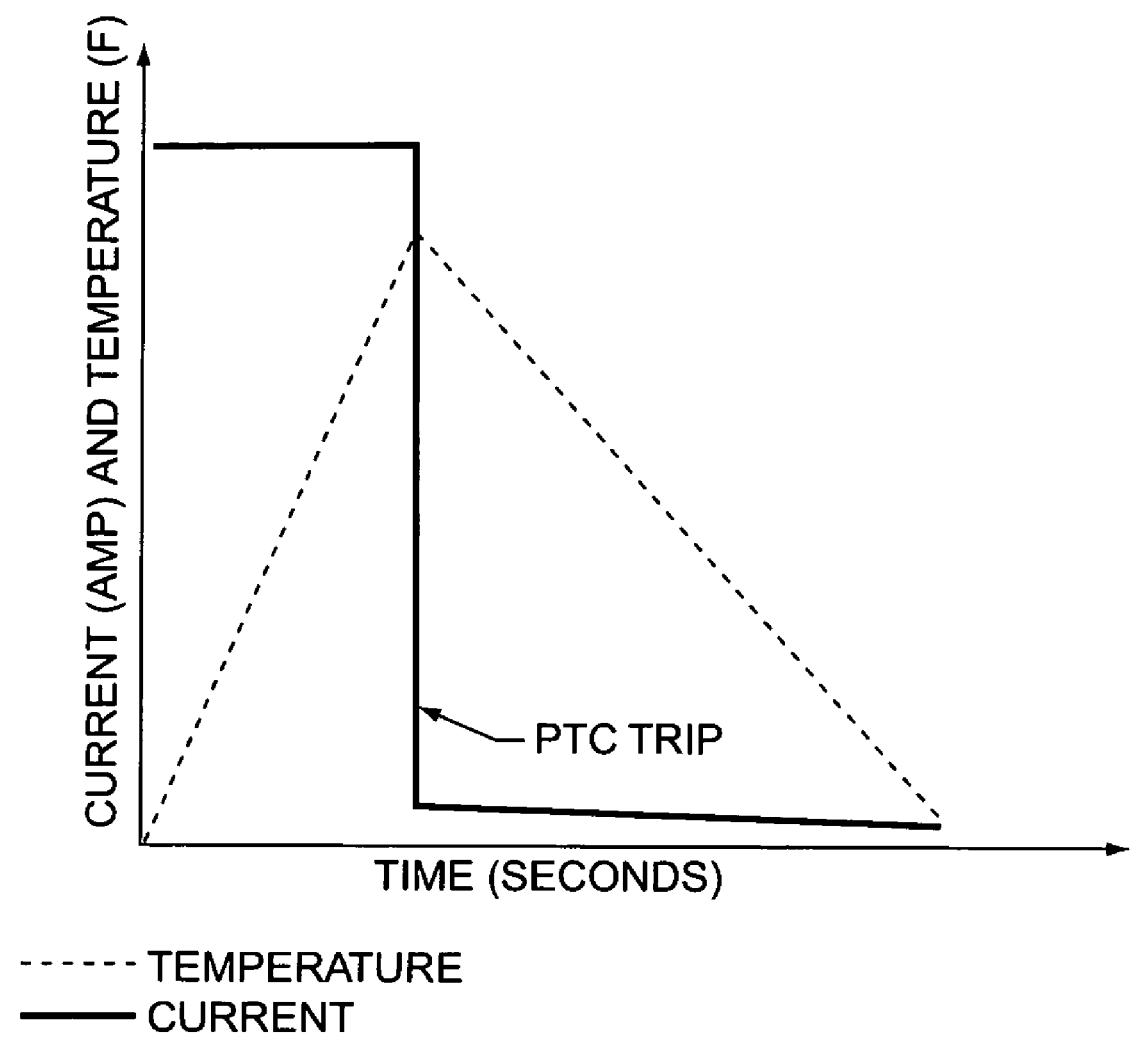
FIG. 4 is a graph depicting both current and temperature with a PTC resistor in the circuit.

FIG. 4 depicts the current (solid) and temperature (dashed) curves of circuit components in a circuit including a PTC resistor 20. Initial high current is not attenuated due to the low resistance of the PTC resistor 20 at normal temperatures. As the temperature increases, it reaches the trip point of the PTC resistor 20, causing the PTC resistor 20 to "trip," or assume a high resistance. This high resistance allows only enough current to flow to maintain the tripped state. As the current is severely limited, the wire and other circuit components rapidly cool.

Figure 5:
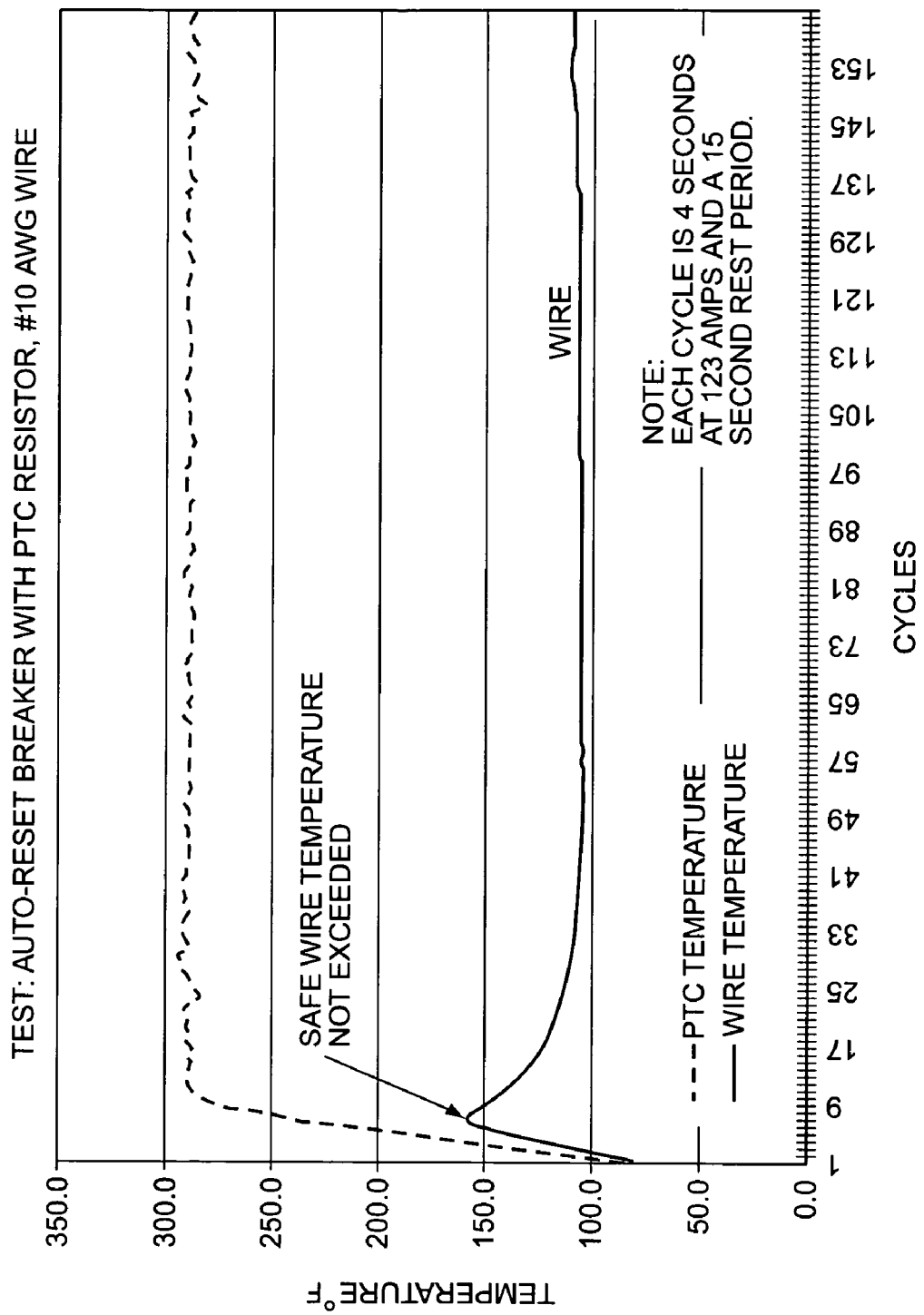
FIG. 5 is a graph of the wire temperature and PTC resistor temperature in an electrical system.

FIG. 5 depicts a circuit with a PTC resistor 20 in series with an auto-reset breaker 18. In this case, the PTC resistor 20 thermal trip point is just over 150° F. When the PTC resistor 20 trips, current in the system is limited to approximately 0.5 A, holding the wire temperature (solid line) down to just over 100° F., well below the wire's safe temperature limit. Note that the temperature of the PTC resistor 20 itself (dashed line) continues to rise with the limited current flow, until it reaches a maximum of just below 300° F. The PTC resistor 20 reaches equilibrium at that point, and will not heat further, as it is limiting the current flow by its tripped (high) resistance.

Figure 6:
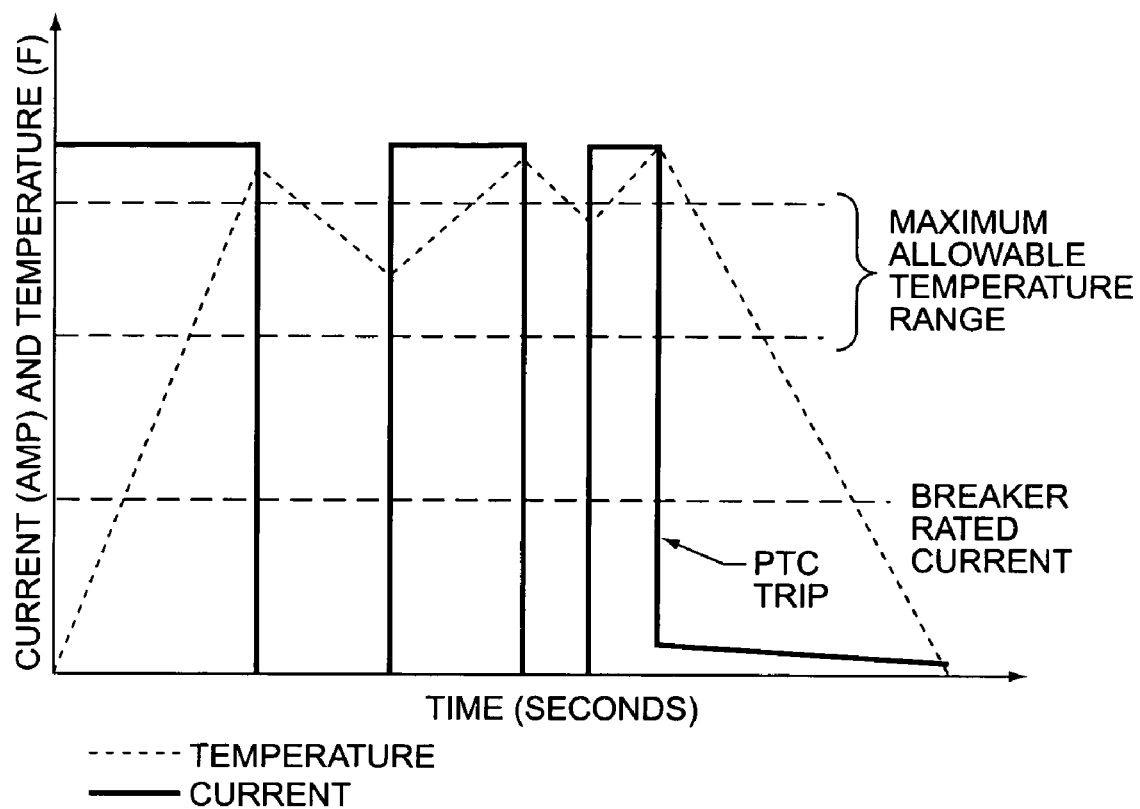
FIG. 6 is a graph depicting both current and temperature in a system with both an auto-reset breaker and a PTC resistor according to the present invention.

FIG. 6 depicts the operation of both the auto-reset breaker 18 and the PTC resistor 20 according to one embodiment of the present invention. The graph depicts the current flow (solid line) and temperature (dashed line) of a wire or other circuit component where the load 14 is used outside its designed duty cycle (such as continuously) or where the circuit includes a short-circuit fault. Initial high current, well in excess of the rated current of the auto-reset breaker 18, causes the temperature to rise. As the temperature of the breaker 18 rises, the breaker 18 trips and the current flow drops to zero. As the breaker 18 cools, it resets and high currents flow once more. This process continues, with circuit component temperatures at or briefly exceeding maximum allowable temperatures, as shown. When the temperature of the PTC resistor 20 reaches its trip point, however, the PTC resistor 20 trips, exhibits a high resistance, and limits the current. System components rapidly cool due to the low current flow.

Figure 7:
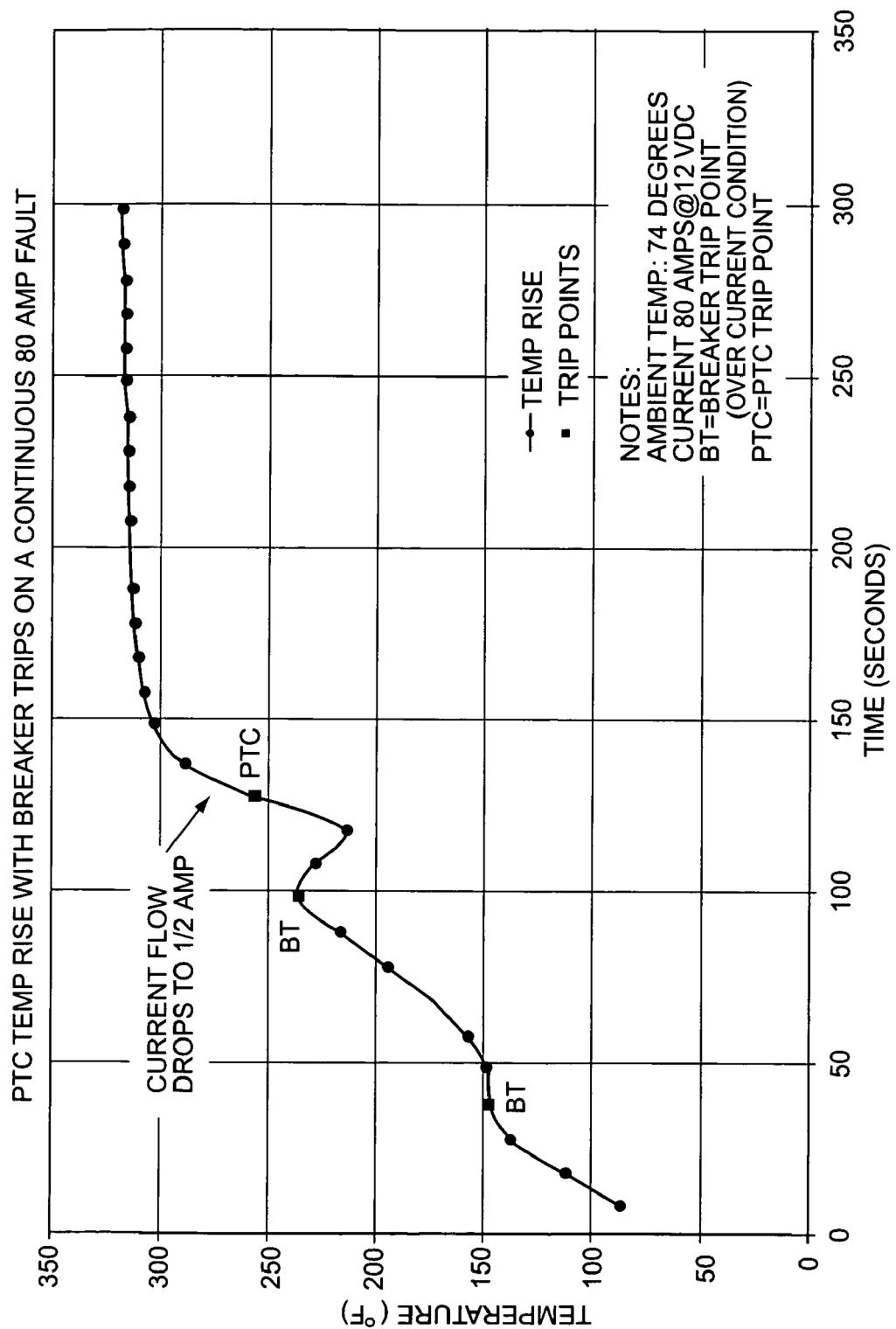
FIG. 7 is a graph of PTC resistor temperature in a circuit including an auto-reset breaker.

FIG. 7 depicts the operation of both the auto-reset breaker 18 and the PTC resistor 20 according to one embodiment of the present invention, as demonstrated by the temperature of the PTC resistor 20. A continuous 80 A current flows through a 50 A auto-reset breaker 18 and PTC resistor 20, simulating continuous use or a short-circuit fault. The breaker 18 allows the current to flow for approximately 40 seconds, and then trips due to heating. While the breaker 18 is open, the temperature stays at 150° F., or drops slightly. When the breaker 18 cools due to no current flow, it auto-resets, and again passes the full 80 A. The PTC resistor 20 continues to heat up to approximately 240° F. as the 80 A current flows for another 50 seconds, when the breaker 18 trips again. The PTC resistor 20 then cools while the auto-reset breaker 18 is tripped and no current flows. At about 120 seconds, the breaker 18, having cooled sufficiently, again resets, passing the full 80 A and causing the PTC resistor 20 to immediately heat further. As the PTC resistor 20 passes 255° F., it reaches its trip temperature and assumes a high resistance value, dropping the current from 80 A to approximately 0.5 A. The PTC resistor 20 continues to heat due to the 0.5 A current flow, reaching a stable temperature of 320° F.

Figure 8:
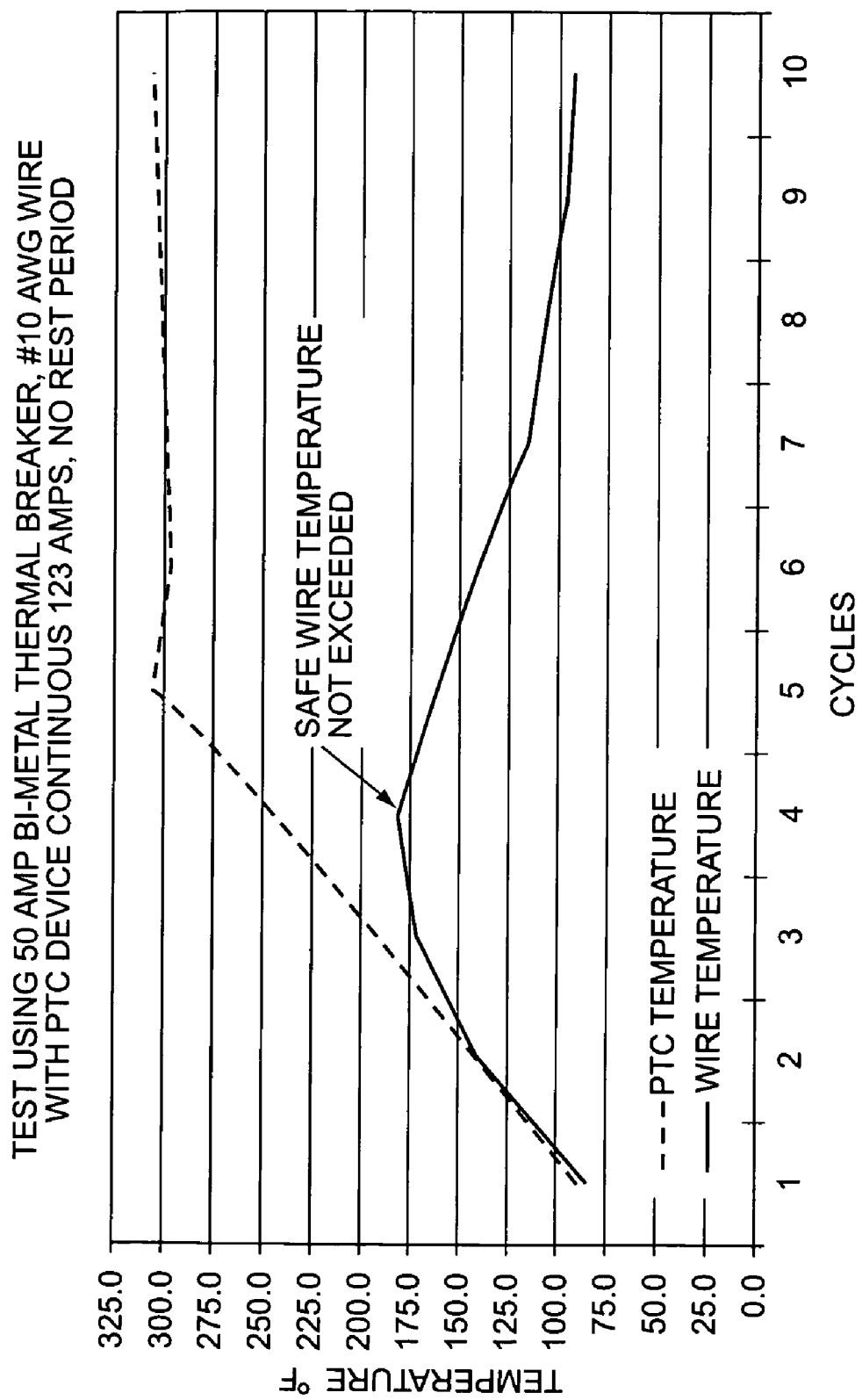
FIG. 8 is a graph of wire temperature depicting operation of a PTC resistor when an auto-reset breaker does not trip.

Depending on the component values selected, the PTC resistor 20 may provide system thermal protection when the auto-reset breaker 18 never trips. FIG. 8 depicts the temperature of a PTC resistor 20 (dashed line) and a #10 AWG wire (solid line) carrying 123 A continuously. Initially, the temperature of both the PTC resistor 20 and the wire rise as the current flows. The PTC reaches its trip point of just over 175° F., sharply increasing its resistance and limiting the current in the wire. Note that the auto-reset breaker 18 in this case never tripped, due to the relatively low trip point of the PTC resistor 20. After tripping, the PTC resistor 20 continues to heat up due to the limited current flow, until it reaches an equilibrium temperature of approximately 300° F. After the PTC resistor 20 trips, the wire carries only a limited current, and the temperature of the wire continues to drop.

In a manner similar to the example of FIG. 8, the PTC resistor 20 also provides protection in the case of sustained use at low currents that cause thermal overload. Returning to the winch example, if the winch 14 were run with no load (such as with no cable attached) for prolonged periods, the current load may never exceed the rating of the auto-reset breaker 18, so the breaker 18 will never trip. However, even the low current load, if sustained for hours, may cause the wiring or other system components to overheat sufficiently to present a fire hazard. In this case the PTC resistor 20 will severely limit the current when it reach its thermal trip point, obviating a fire hazard that the auto-reset breaker 18 cannot address. A similar situation is a starter motor circuit protected by a high current fuse (e.g., 280 A), continuously drawing relatively low current (e.g., 45–50 A) for a duration far in excess of that anticipated in normal engine-starting operation.

The PTC resistor 20 and auto-reset breaker 18 are preferably connected in series, so that the same current flows through both components. As discussed above, the PTC resistor 20 exhibits increased resistance as temperature rises, until it reaches a trip temperature at which its resistance reaches a maximum and does not change with further temperature increases. Another characteristic of the PTC resistor 20 is that its failure mode is open-circuit. That is, when the PTC resistor 20 fails (due to excessively high temperature or for other reasons), its resistance increases to infinity, and it prohibits further current flow through it. Thus, an additional benefit of connecting the PTC resistor 20 and auto-reset breaker 18 in series is that in the event of component failure, the PTC resistor 20 acts as a fuse, opening the circuit and rendering it inherently safe until the PTC resistor 20 is replaced.

Figure 9:
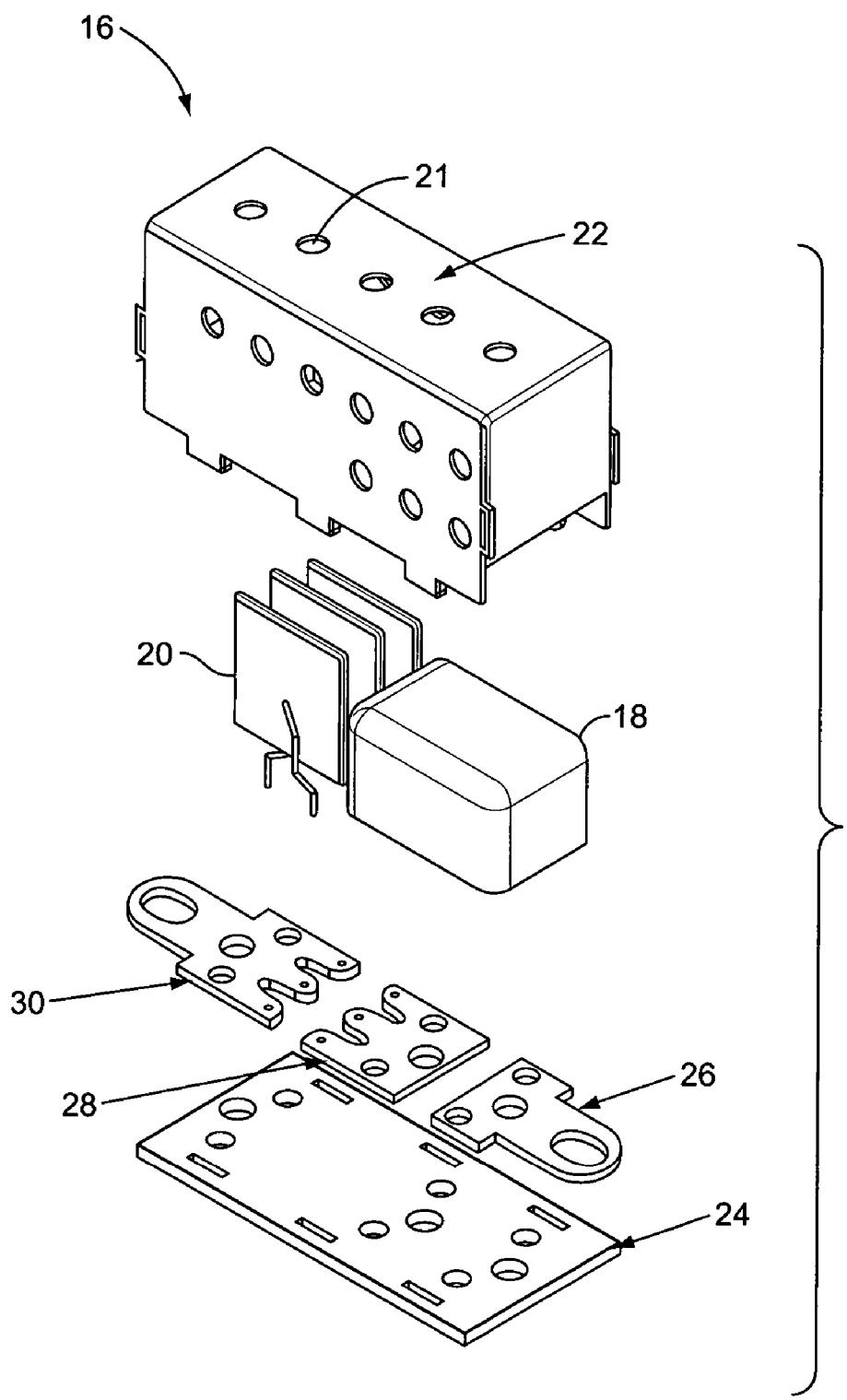
FIG. 9 is an exploded perspective view of an overcurrent protection circuit according to one embodiment of the present invention.

One form of mounting these components 18, 20 is depicted in FIG. 9. The circuit of FIG. 9 comprises three conductive nodes: an input 30, and output 26, and a common node 28 connecting the PTC resistor 20 and the auto-reset breaker 18 (those of skill in the art will note that the node 26 may be an input and the node 30 an output). The PTC resistor 20 and the auto-reset breaker 18 are respectively connected to one of the input 30 or output 26 nodes. The conductive nodes 26, 28, 30 may be connected to an insulating base 24. The components of the overcurrent protection circuit 16 may be mechanically assembled with fasteners, adhesives, solder, or other methods, not shown, as well known in the art.

Figure 10:
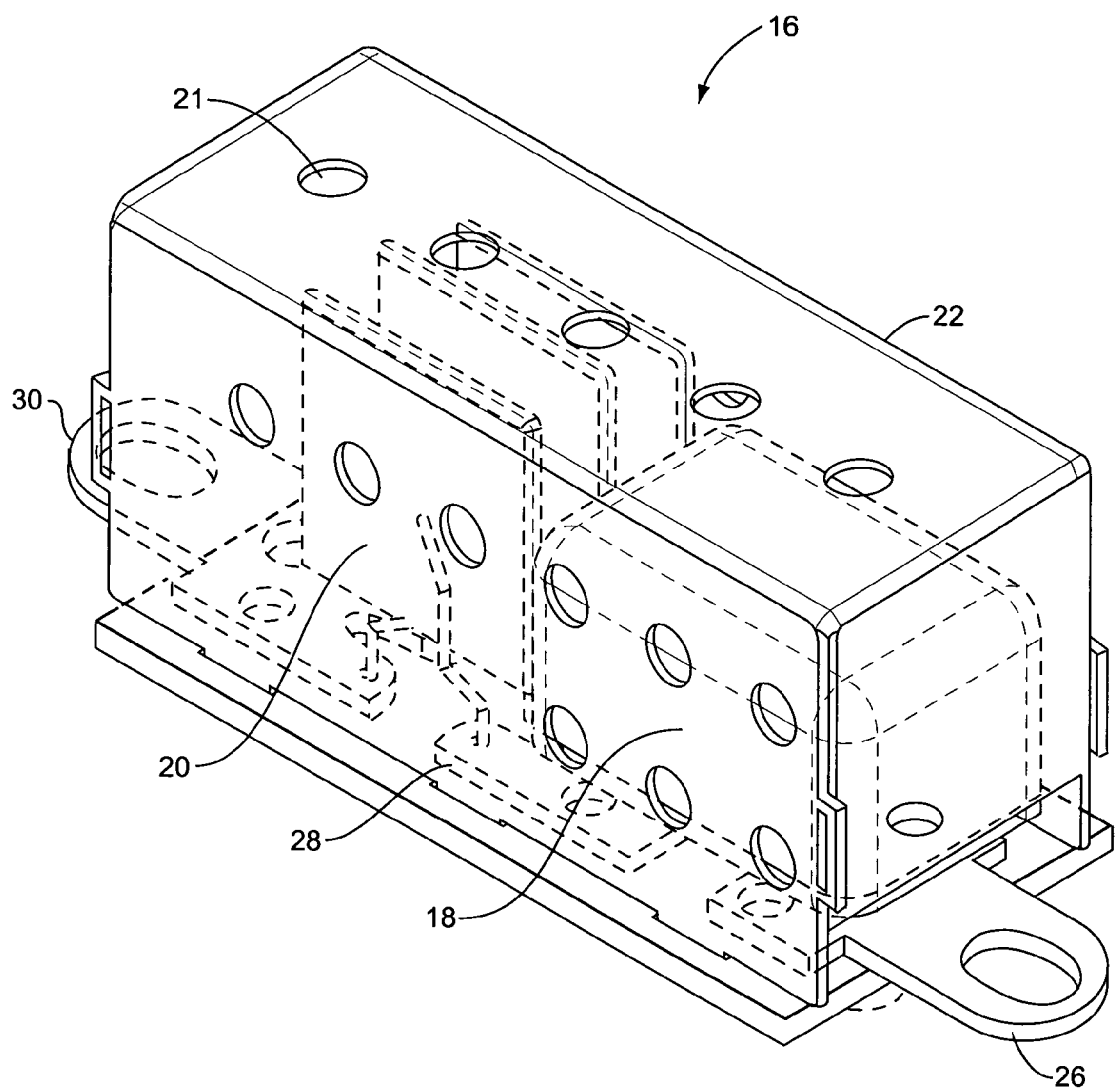
FIG. 10 is a perspective view of an overcurrent protection circuit according to one embodiment of the present invention.

As depicted in FIGS. 5, 7 and 8, the PTC resistor 20 may reach temperatures in the range of 300° F. when providing current-limiting protection in tripped mode. This in itself may represent a hazard, and/or a product liability exposure. According to one embodiment of the present invention, a thermal housing 22 contains both the PTC resistor 20 and the auto-reset breaker 18, as depicted in FIGS. 9 and 10. The housing 22 may include a plurality of ventilation holes 21 for controlled conductive and convective cooling. The housing 22 also reduces the effect of ambient temperature on the PTC resistor 20, providing more consistent operation over a range of temperatures.

While reference is made herein to "a" or "the" PTC resistor 20, as shown in FIGS. 9 and 10, the PTC resistor component 20 may comprise two or more PTC resistor elements 20 connected in parallel. This may be necessary to provide the desired thermal properties in a small form factor, and/or to achieve sufficiently low resistance at ambient temperature. Connecting resistive elements 20 in parallel reduces their effective resistance, as well known in the art, and the component values and effective resistance may easily be calculated for a given application by those of skill in the art. The electrical performance of a PTC resistor 20 is influenced by its thermal environment. If the PTC resistor 20 is thermally insulated, the component 20 is "derated." That is, it will trip faster, and maintained the tripped state longer, than if the component 20 is not insulated and hence allowed to cool more rapidly.

In one embodiment, the thermal environment of at least the PTC resistor 20, and preferably of the entire overcurrent protection circuit 10, is controlled to achieve a greater predictability and consistency of electrical operation. In particular, in one embodiment of the present invention, the housing 22 may be solid—that is, without ventilation holes 21. The interior space of the housing 22 may be filled with a molten, insulating epoxy that solidifies, encapsulating the components 18, 20. In a preferred embodiment, the conductive nodes 26, 28, 30 are encapsulated within the epoxy, and electrical connection to the input and output nodes 26, 30 are provided by mounting posts protruding exterior to the epoxy. As known in the art, the solidified epoxy, with components 18, 20 encased within it, may be removed from the housing 22 prior to deployment in a product. The epoxy may comprise any electrically insulating, thermally conductive encapsulation material, as well known in the electronic packaging arts. The epoxy is typically more thermally conductive than air.

To thermally insulate the PTC resistors 20, in one or more embodiments, a pocket of air is formed around the PTC resistors 20—that is, between the PTC resistors 20 and the surrounding epoxy. One way to achieve this air pocket is to wrap the PTC resistors 20 with a closed-cell plastic or similar foam, having a melting point comparable to the pour temperature of the epoxy. When the epoxy is poured into the housing 22, it initially solidifies around the exterior of the auto-reset breaker 18 and the foam surrounding the PTC resistors 20. As the molten epoxy further solidifies, continued heat from the epoxy may cause the foam to melt, shrink, burn away, or otherwise be displaced, leaving an insulating air pocket around the PTC resistors 20. Alternatively, even if the foam does not melt, the air within the foam cells may effectively thermally insulate the PTC resistors 20 from the epoxy, achieving the desired insulation. As discussed above, insulating the PTC resistors 20 provides more predictable and consistent electrical operation, such as derating the component 20 to trip faster and maintain the tripped state longer than if the PTC resistors 20 had direct thermal contact with the epoxy.

Figure 11A:
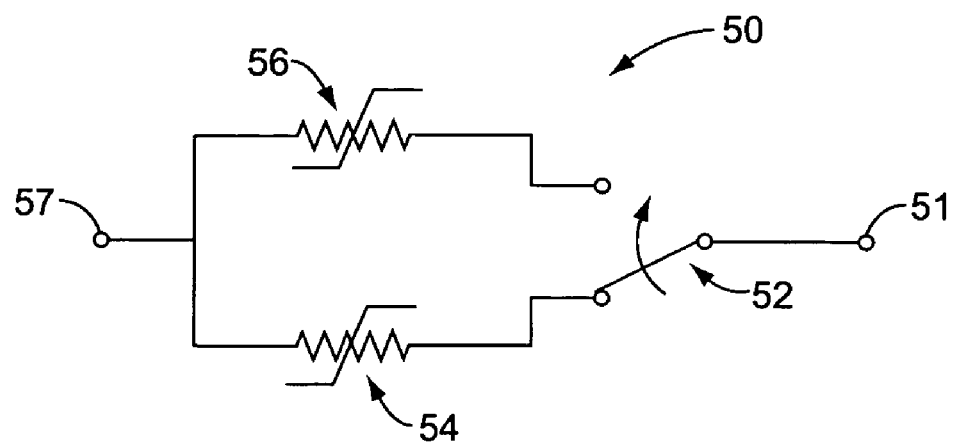
FIGS. 11A and 11B are schematic diagrams of overcurrent protection circuits.

FIG. 11A depicts an overcurrent protection circuit 50 according to another embodiment of the present invention that protects against both excessively high current and unanticipated, sustained low current. The circuit 50 may advantageous protect an automotive starter motor current supply, for example. The circuit 50 includes a two-pole auto-reset breaker 52 connected to an input (output) node 51 and to either a first PTC resistor 54 in a non-tripped state or a second PTC resistor 56 in a tripped state. The first and second PTC resistors 54, 56 are connected to an output (input) node 57. In the non-tripped, or thermally cool, state, the two-pole auto-reset breaker 52 is connected in series with the first PTC resistor 54; the second PTC resistor is bypassed. The first PTC resistor 54 is selected and configured to trip upon sustained, relatively low current, such as 45–50 A. This current would not normally trip the breaker 52, and hence the first PTC resistor 54 provides overcurrent protection in the case that sustained currents are supplied where only brief, intermittent current was anticipated in the circuit's design.

The breaker 52 is selected and configured to trip on excessively high current, such as for example 250 A. When high current trips the breaker 52, current is directed through the second PTC resistor 56. This second PTC resistor 56 may be selected and configured to trip upon excessive high current, such as for example 280 A. Since continued high current (generating heat in the breaker 52) will keep the breaker in the tripped state, the second PTC resistor 56 provides protection for the target circuit by tripping to a low-conducting state when the excessive high current heats the component 56 to its trip point. In this manner, the circuit of FIG. 11A protects the target circuit against both excessive high current and unanticipated, sustained low current.

Figure 11B:
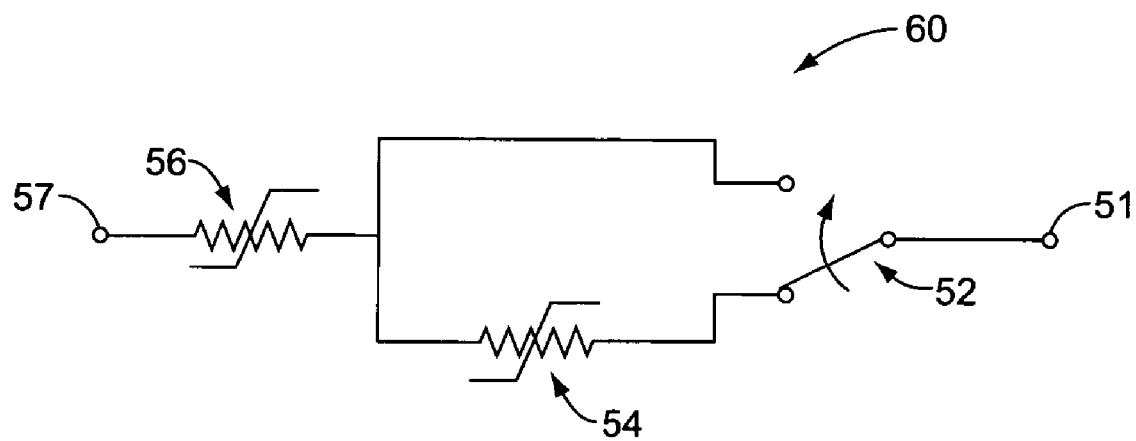

FIG. 11B depicts an alternate configuration for the overcurrent protection circuit 50. In this embodiment, the two poles of the breaker 52 are connected to both the first and second PTC resistors 54, 56 in the non-tripped state, and is connected to only the second PTC resistor 56 in the tripped state. In this embodiment, in the non-tripped state, unanticipated, sustained low current will trip the first PTC resistor 54 as described above; the second PTC resistor 56 is only tripped by high current, and will present a low resistance in the presence of low current. In the case of excessive high current, the breaker 52 will trip, directing current only through the second PTC resistor 56. If the excessive high current exceeds a brief duration the breaker 52 will remain tripped, but the second PTC resistor 56 will trip, providing overcurrent protection to the target circuit. The circuit configuration of FIG. 11B offers additional protection in the event that the second PTC resistor 56 trips due to excessive high current, and restricts that current to a small amount by its increased resistance. In this case, when the breaker 52 cools and resets to connect to the first PTC resistor 54, even the low current (e.g., below 45 A) that the first PTC resistor 54 would otherwise allow, is blocked by the tripped second PTC resistor 56.

Figure 12:
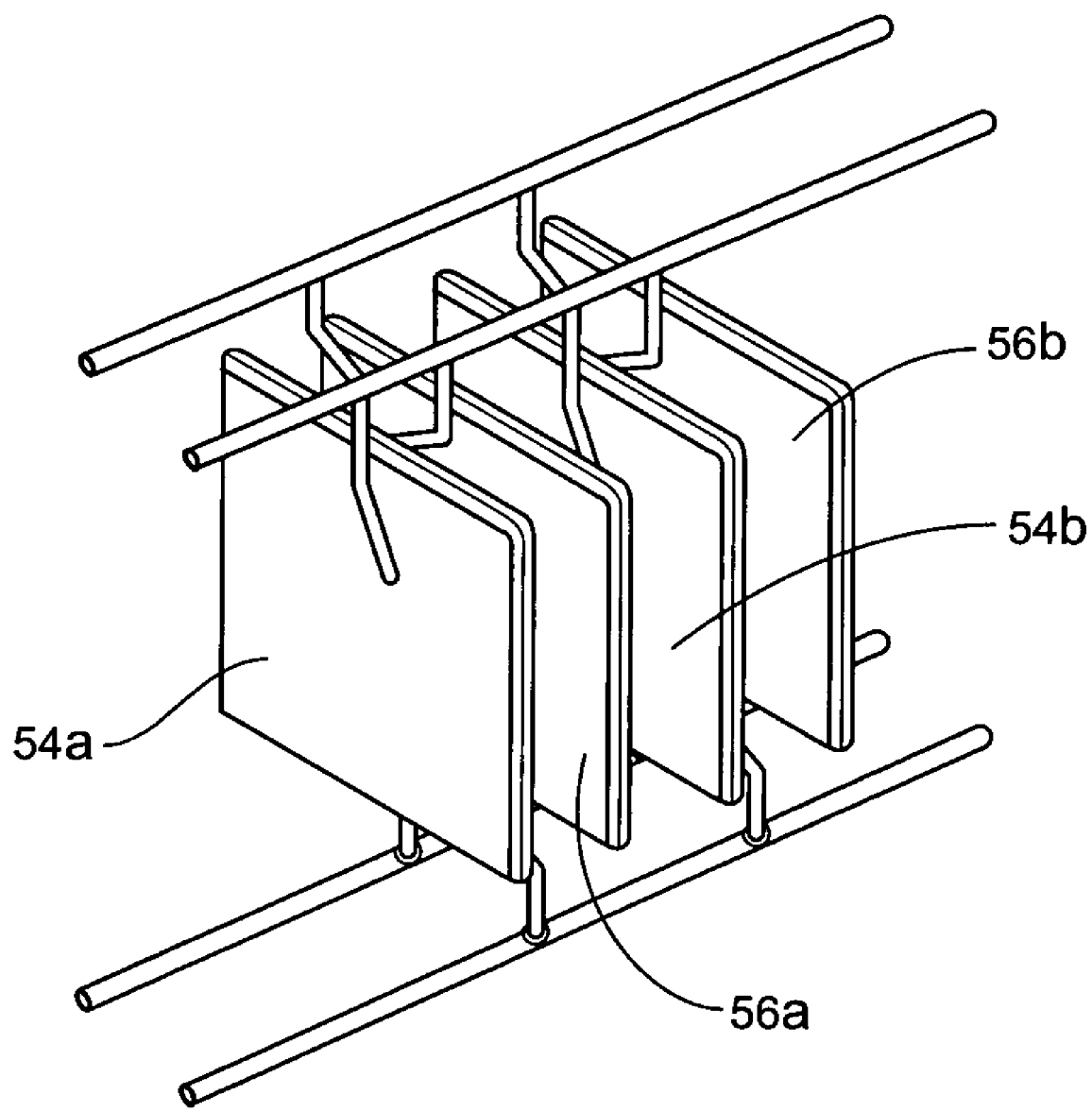
FIG. 12 is a perspective view of a stacked-resistor configuration for overcurrent protection circuits.

FIG. 12 depicts the physical configuration of the overcurrent protection circuits 50 or 60, according to one embodiment. The first and second PTC resistors 54, 56 each comprise at least two PTC resistor components 54a, 54b and 56a, 56b, respectively. The PTC resistor components 54a, 56a, 54b, 56b are alternately "stacked," or interleaved, for mutual thermal coupling. That is, when one of the first or second set of PTC resistor components heats up and trips, it heats other PTC resistor components. For example, if PTC resistor 54 trips, the heat from PTC resistor components 54a, 54b will transfer thermal energy to the PTC resistor components 56a, 56b. This shortens the time to tripping of the PTC resistor 56, if the current it is carrying causes it to trip, by elevating the component 56a, 56b temperatures. In this manner, mutual thermal coupling of PTC resistor components is utilized to advantageously alter their electrical performance.

The stacked PTC resistor components 54a, 56a, 54b, 56b may be encapsulated in epoxy with the two-pole breaker 52, as described above. The stack of interleaved PTC resistor components 54a, 56a, 54b, 56b is preferably surrounded by a thermally insulating air pocket, as described above.

The circuits 50, 60 of FIGS. 11A and 11B, particularly when the components of PTC resistors 54, 56 are stacked for mutual thermal coupling as depicted in FIG. 12, provide a naturally resetting overcurrent protection mechanism for a circuit such as an engine starter—where either excessive high current or unanticipated, sustained low current may cause a fire hazard. The relevant PTC resistor 54, 56 will trip in response to the circuit current, and will maintain a tripped state for as long as current is supplied to the circuit. Once the power is removed, and the PTC resistors 54, 56 cool, the system resets and is operative to allow normal current to flow for normal operation, while maintaining the ability to provide overcurrent protection if the relevant hazardous current situation again develops. In some applications, the resetting feature of the overcurrent protection circuit 50 or 60 is undesirable. For example, in some consumer vehicle applications, once a hazardous current situation develops, it may be preferable to protect the target circuit, and not reset the protection circuit but rather disable the target circuit, necessitating a repair by a qualified technician, who may troubleshoot and fix the anomaly giving rise to the hazardous currents. In these applications, the circuits 50, 60 of FIGS. 11A and 11B may be utilized, substituting appropriately rated fuses or breakers for the PTC resistors 54, 56, e.g., a 45–50 A slow-blow fuse for resistor 54, and a 280 A fuse for resistor 56.

Various embodiments of the present invention have been described herein with respect to protecting components in vehicle-related circuits, such as a circuit powering an aftermarket vehicle winch, or one driving a starter motor in a vehicle. However, those of skill in the art will recognize that a broad variety of products may benefit from the thermal protection of the present invention. The overcurrent protection circuit of the present invention may find utility in a broad number of applications both within and external to a vehicle, where low-voltage, high-current faults or heavy usage present thermal hazards due to high currents. As used herein, the term "vehicle" is broadly defined, and includes any self-propelled human transportation mechanism that includes a battery, alternator or generator and one or more high-current loads such as a DC electric motor. As such, the term "vehicle" includes, for example, automobiles, trucks, motorcycles, All Terrain Vehicles (ATVs), boats, aircraft, trains and the like.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. An overcurrent protection circuit to limit the current in an electrical system, comprising:
   a first component having first and second conductive states, said first component assuming the first state by default, and assuming the second state for a duration in response to detecting sustained current in excess of a first predetermined current value, said first component returning to the first state following said duration; and
   a second component connected in series with said first component and operative to limit the current through the circuit to a second predetermined current value less than said first predetermined value in response to heat in excess of a first predetermined thermal value, following at least one cycle of said first component assuming a nonconductive state.

2. The circuit of claim 1 wherein in said first state is conductive, and said second state is nonconductive.

3. The circuit of claim 2 wherein the heat is generated by current through said second component when said first component is in the first conductive state.

4. The circuit of claim 2 wherein said first component comprises an auto-reset breaker.

5. The circuit of claim 4 where said auto-reset breaker is thermally actuated.

6. The circuit of claim 1 wherein said first component has an input and two outputs, and wherein said first component conducts current from said input to a first output in said first state, and conducts current from said input to a second output in said second state, and wherein said second component is connected in series to said first output.

7. The circuit of claim 6 further comprising a third component connected in series to said second output, said third component operative to limit the current to a third predetermined current value less than said first predetermined value in response to heat in excess of a second predetermined thermal value.

8. The circuit of claim 7 wherein one of said second and third components comprises two or more component elements in parallel, and wherein said component elements of said second and third components are physically arranged in an interleaved stack to effect mutual thermal coupling.

9. The circuit of claim 6 further comprising a third component connected to said second output and said second component opposite said first output, said third component operative to limit the current to a third predetermined current value less than said first predetermined value in response to heat in excess of a second predetermined thermal value.

10. The circuit of claim 9 wherein one of said second and third components comprises two or more component elements in parallel, and wherein said component elements of said second and third components are physically arranged in an interleaved stack to effect mutual thermal coupling.

11. The circuit of claim 1 wherein said second component comprises one or more positive temperature coefficient (PTC) resistors connected in parallel with each other, said PTC resistor(s) exhibiting increased resistance with temperature up to a trip point at which said resistance is constant.

12. The circuit of claim 11 wherein said second predetermined current value is the voltage across said PTC resistor(s) divided by said constant, trip point resistance.

13. A method of manipulating thermal properties of electrical components to alter their electrical performance, comprising:
   providing a thermal auto-reset breaker and one or more PTC resistors electrically connected in series;
   encasing the breaker and the PTC resistors in a thermally conductive material to enhance cooling of the breaker; and thermally insulating the PTC resistors from the thermally conductive material to retard cooling of the PTC resistors.

14. The method of claim 13 wherein the thermally conductive material is an epoxy resin.

15. The method of claim 13 wherein the auto-reset breaker is operative to interrupt current flow at or above a first predetermined temperature, and to allow current flow below the first predetermined temperature.

16. The method of claim 15 wherein the one or more PTC resistors are operative to limit current flow to a predetermined value at or above a second predetermined temperature.

17. The method of claim 13 wherein the auto-reset breaker is a two-pole auto-reset breaker, and wherein the one or more PTC resistors comprise at least two PTC resistors.

18. The method of claim 17 wherein the at least two PTC resistors are thermally coupled.

19. The method of claim 18 wherein the at least two thermally coupled PTC resistors are thermally insulated from the thermally conductive material.

20. The method of claim 17 wherein the two PTC resistors are connected in parallel, with each PTC resistor connected to one output of the two-pole auto-reset breaker.

21. The method of claim 17 wherein the two PTC resistors are connected in series, the series combination connected to one output of the two-pole auto-reset breaker, with the other output of the two-pole auto-reset breaker connected to the node intermediate the two PTC resistors.

* * * * *